(12) United States Patent
Liu et al.

(10) Patent No.: US 11,479,572 B2
(45) Date of Patent: Oct. 25, 2022

(54) IFOSFAMIDE INTERMEDIATE, PREPARATION METHOD AND APPLICATION THEREOF

(71) Applicants: Zining Liu, Haikou (CN); Qiang Li, Haikou (CN); Yahui Liu, Haikou (CN)

(72) Inventors: Zining Liu, Haikou (CN); Qiang Li, Haikou (CN); Yahui Liu, Haikou (CN)

(73) Assignee: HAINAN ZHUOKE PHARMACEUTICAL CO., LTD., Hainan (CN)

( * ) Notice: Subject to any disclaimer, the term of this patent is extended or adjusted under 35 U.S.C. 154(b) by 0 days.

(21) Appl. No.: 17/492,597

(22) Filed: Oct. 2, 2021

(65) Prior Publication Data

US 2022/0119430 A1    Apr. 21, 2022

(30) Foreign Application Priority Data

Oct. 19, 2020 (CN) .......................... 202011115781.0

(51) Int. Cl.
    *C07F 9/6584*      (2006.01)
    *C07F 9/22*      (2006.01)

(52) U.S. Cl.
    CPC .......... *C07F 9/65846* (2013.01); *C07F 9/222* (2013.01)

(58) Field of Classification Search
None
See application file for complete search history.

(56) References Cited

FOREIGN PATENT DOCUMENTS

| CN | 101058589 A | 10/2007 |
|---|---|---|
| CN | 101087800 A | 12/2007 |

*Primary Examiner* — Ana Z Muresan

(57) ABSTRACT

The invention discloses an ifosfamide intermediate, a preparation method and application thereof. The ifosfamide intermediate has formula I. The ifosfamide intermediate reacts with a chlorinating agent, and then cyclization is performed under the action of an organic base to obtain ifosfamide. Compared with the existing synthetic routes, the method of the invention has the advantages that the use of highly toxic and explosive ethyleneimine can be avoided, and the use of explosive chemicals can be avoided.

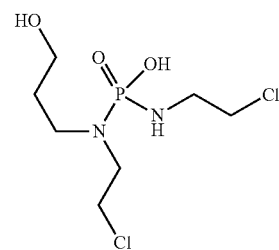

I

9 Claims, No Drawings

IFOSFAMIDE INTERMEDIATE, PREPARATION METHOD AND APPLICATION THEREOF

This application claims priority to Chinese Patent Application No. 202011115781.0, filed on Oct. 19, 2020, which is incorporated by reference for all purposes as if fully set forth herein

TECHNICAL FIELD

The invention belongs to the field of medicine, and specifically relates to an ifosfamide intermediate, a preparation method thereof and application in the preparation of ifosfamide.

BACKGROUND TECHNIQUE

Ifosfamide (compound of formula III) is an anti-tumor drug that has been marketed, and its structural formula is shown in formula III.

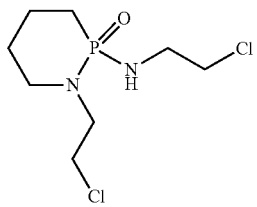

There are mainly three published synthetic routes. Route 1 and route 2 both use aziridine as the starting material. After obtaining the cyclized intermediate, route 1 uses chloroethylamine hydrochloride to obtain ifosfamide. In route 2, reacting 4 with aziridine, the ring is opened with hydrochloric acid to obtain ifosfamide.

Route 3 is to use 3-amino-1-propanol to react with phosphorus oxychloride, then react with chloroethylamine hydrochloride to form an intermediate, then react with chloroacetyl chloride, and reduce to obtain ifosfamide. Route three is as follows.

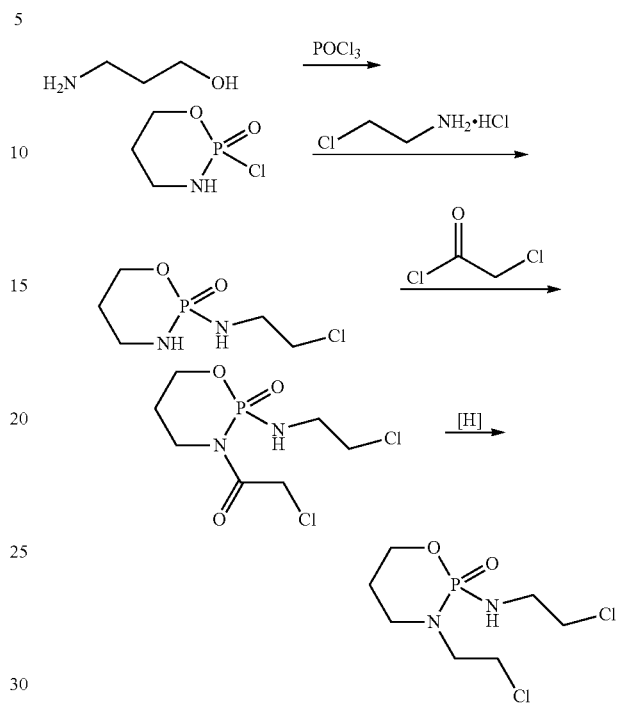

Among them, the aziridine used in route 1 and route 2 is highly toxic and prone to polymerization explosion, which brings great hidden dangers to safe production. In route 3, the reduction of amides to amines requires the use of sodium borohydride, which is an explosive chemical, and the use process is strictly controlled.

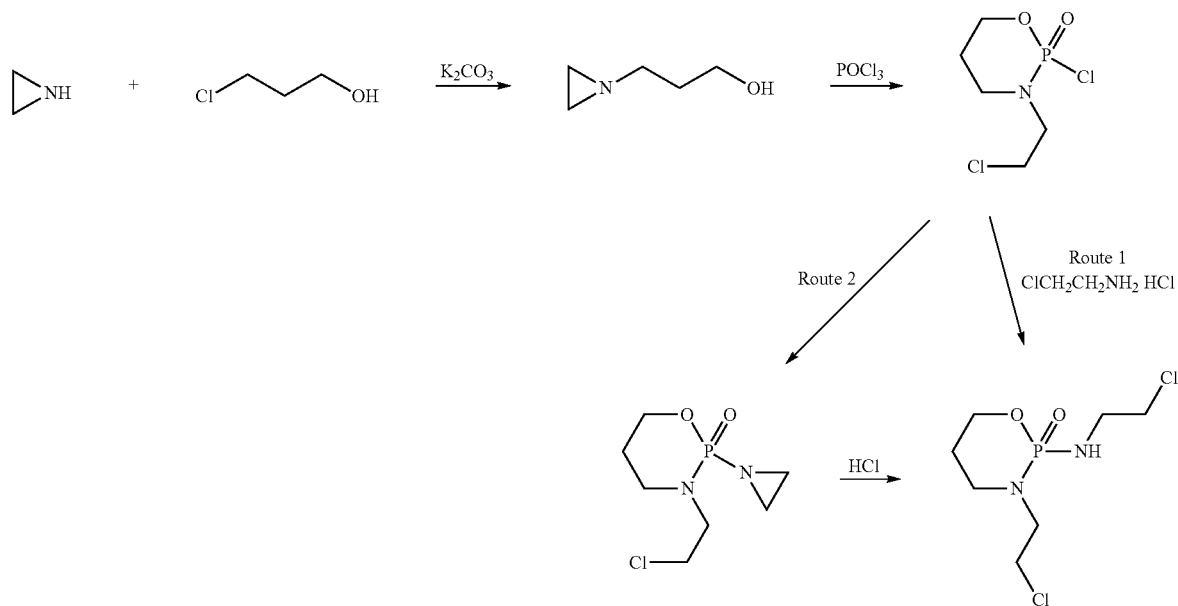

In order to avoid the use of highly toxic and explosive chemicals, it is necessary to find a safer synthetic route.

SUMMARY OF THE INVENTION

Object of the invention: The object of the present invention is to provide an intermediate for preparing ifosfamide and a preparation method thereof.

Another object of the present invention is to use the intermediate to prepare ifosfamide.

In order to achieve the above objective, the technical solution of the present invention is as follows:

An ifosfamide intermediate has formula I:

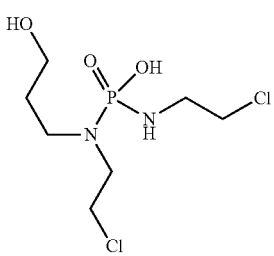

The present invention discloses a preparation method of the ifosfamide intermediate, which is prepared by reacting a compound of formula II with 3-bromo-propane-1-ol in the presence of an acid binding agent:

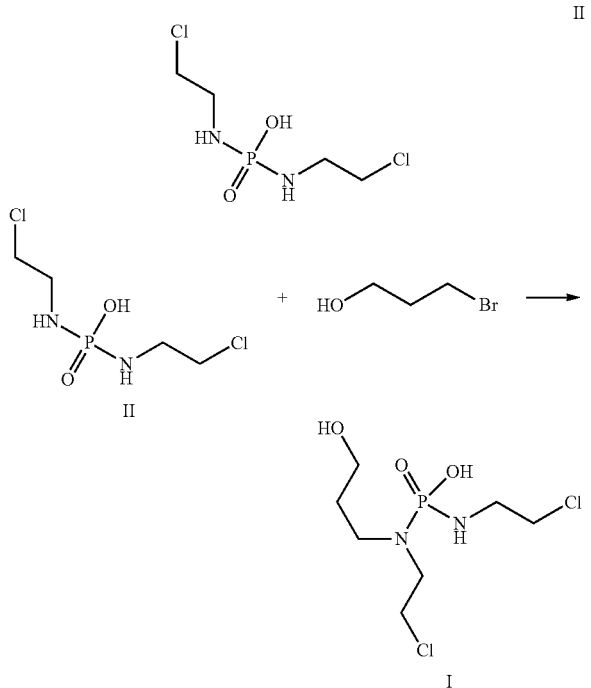

Specifically, the acid binding agent is triethylamine. 1 to 1.5 equivalents of triethylamine used as the acid binding agent, the compound of formula II reacts with 0.9 to 1.2 equivalents of 3-bromo-propane-1-ol to obtain the compound of formula I. Preferably, the reaction is carried out in an organic solvent. Preferably, the organic solvent is dichloromethane. Preferably, the reaction temperature is not higher than 30° C. by controlling the triethylamine dropping rate during the reaction, and the reaction mixture is stirred at room temperature for about 3 hours.

In a preferred embodiment, dichloromethane is used as a solvent to dissolve the compound of formula II. 1 Molar equivalent of 3-bromo-propane-1-ol is added, and 1.35 molar equivalent of triethylamine is added as an acid binding agent. After reacting at room temperature for 3 hours, the organic phase is washed with water, n-heptane is added, the temperature is lowered to 0° C. for crystallization, and after drying, the compound of formula 1 is obtained.

The compound of formula 2 is prepared according to the method disclosed in CN 101087800A.

The present invention also discloses a method for preparing ifosfamide, using a compound of formula I, reacting with a chlorinating agent, and then obtaining ifosfamide in the present of a base.

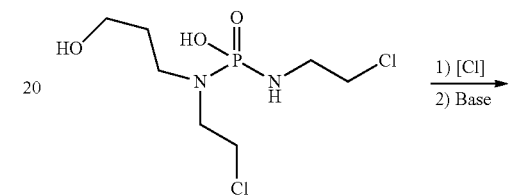

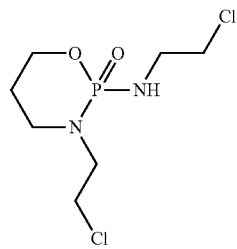

The chlorinating agent is thionyl chloride or oxalyl chloride.

A molar ratio of the chlorinating agent to the compound of formula I is 0.5 to 1.5:1.

Preferably, the molar ratio of the chlorinating agent to the compound of formula I is 0.5 to 0.6:1.

The base is an organic base.

Preferably, the organic base is triethylamine, diisopropylethylamine, 1,8-diazabicycloundec-7-ene, pyridine, 4-dimethylaminopyridine, or a combination thereof.

Preferably, a molar ratio of the organic base to the compound of formula I is 1 to 5:1.

More preferably, the molar ratio of the organic base to the compound of formula I is 1 to 2:1.

In a preferred embodiment, the compound of formula I is used to react with thionyl chloride or oxalyl chloride, and then ifosfamide is obtained in the presence of an organic base.

In a more preferred embodiment, the compound of formula I is reacted with thionyl chloride or oxalyl chloride, and then ifosfamide is obtained in the presence of an organic base. The molar ratio of thionyl chloride or oxalyl chloride to the compound of formula I is 0.5-1.5:1, and the organic base is triethylamine, diisopropylethylamine, 1,8-diazabicycloundec-7-ene (DBU), pyridine, orn4-dimethylaminopyridine.

In a more preferred embodiment, the compound of formula I is reacted with thionyl chloride or oxalyl chloride, and then ifosfamide is obtained in the presence of an organic base. The molar ratio of thionyl chloride or oxalyl chloride to the compound of formula I is 0.5-1.5:1, and the organic base is triethylamine, diisopropylethylamine, 1,8-diazabicycloundec-7-en, pyridine, or 4-dimethylaminopyridine. A molar ratio of organic base to the compound of formula 1 is 1-5:1.

Preferably, the molar ratio of oxalyl chloride and thionyl chloride to the compound of formula I is 0.5-0.6:1, and more preferably, the molar ratio of organic base to the compound of formula is 1-2:1.

In a preferred embodiment, dichloromethane is used as a solvent to dissolve the compound of formula I. A specified amount of chlorinating agent is added dropwise to control the dropping rate and keep the temperature not higher than 30° C. After the reaction is complete, the reaction temperature is reduced to below 10° C. A specified amount of organic base is added dropwise to control the dropping rate and keep the temperature not higher than 30° C. After the dropwise addition, the mixture is stirred at 25±5° C. for 10 hours, add water is added to the reaction system, stirred for 1 hour. The water phase is separated, and the organic phase is washed twice with water. n-Heptane is added dropwise to the organic phase, crystallizing below 5° C., filtering and drying to obtain ifosfamide.

Beneficial effects: The preparation method of the present invention avoids the highly toxic and explosive N-cyclopropane, avoids the use of sodium borohydride, which is an explosive compound, and can obtain ifosfamide by using common chemicals.

DETAILED DESCRIPTION

The present invention will be further described in detail below in conjunction with specific embodiments.

Example 1 Preparation of Phenyl Bis(Chloroethylamino)Phosphate

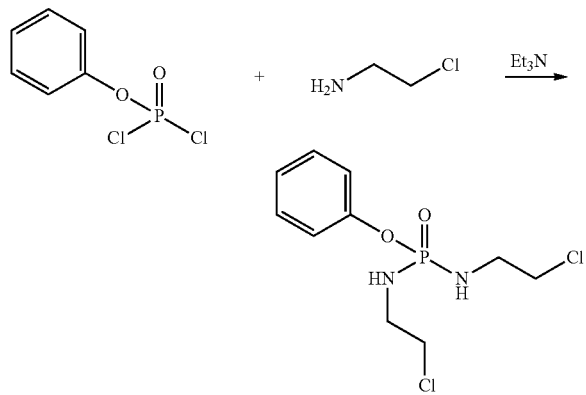

2-Chloroethylamine hydrochloride (116 g, 1.0 mol) was added to a reaction flask. Dichloromethane (1200 ml) was then added, and the reaction solution was cooled to 5° C. Phenyl dichlorophosphate (105.5 g, 0.5 mol) was added, and triethylamine (202 g, 2 mol) was added dropwise. The dropping rate was controlled so that the temperature was not higher than 5° C. The reaction mixture was stirred at 5-10° C. for 12 hours.

1.2 mol/L diluted hydrochloric acid (200 ml) was added to the reaction mixture, and the reaction mixture was stirred for 30 minutes, standing still for layering. The organic phase was washed with 1.2 mol/L diluted hydrochloric acid, washed with purified water, and dried with anhydrous sodium sulfate. The mixture was filtered, and the dichloromethane was concentrated to dryness under reduced pressure. The resulting residue was dissolved in ethyl acetate (50 ml), n-heptane (100 ml) was added dropwise, the temperature was slowly cooled to 5° C., and the mixture was stirred for crystallization for 12 hours. The mixture was filtered, washed with cold n-heptane, and dried under reduced pressure at room temperature overnight. A total of 87.2 g of white solid was obtained, a yield of 61%. The NMR of the obtained product showed that the target compound was obtained. $^1$H-NMR (DMSO-d6+D$_2$O): 7.40-7.21 (m, 5H), 3.64 (t, J=3.2 Hz, 4H), 2.93 (t, J=3.2 Hz, 4H); $^{13}$C-NMR (DMSO-d6+D$_2$O): 151.7, 130.1, 121.3, 120.3, 45.7, 38.1.

Example 2 Preparation of Compound of Formula I

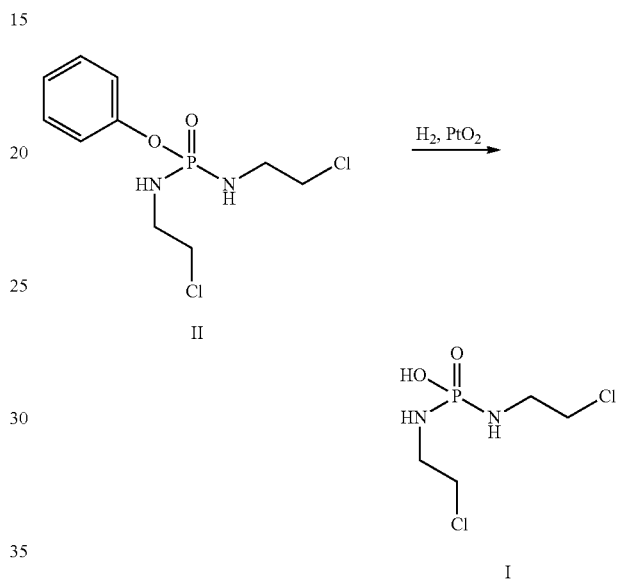

The intermediate bis(chloroethylamino) phenyl phosphate (87.2 g, 0.29 mol) obtained in Example 1 was dissolved in 95% ethanol (90 ml), and with platinum oxide (1.5 g), was add to a hydrogenation kettle, flashing with nitrogen 3 times and then with hydrogen 3 times. Hydrogenate was conducted at 50° C. and 0.5 MPa pressure. After 12 hours, the reaction was terminated and filtered to remove platinum oxide. The filtrate was stirred at 0° C. for crystallization, filtered, and dried under vacuum at 45° C. for 12 hours to obtain 59 g of the compound of formula II, a yield of 92.2%. The NMR of the obtained product showed that the target compound was obtained. $^1$H-NMR (DMSO-d6+D$_2$O): 3.64 (t, J=3.2 Hz, 4H), 2.93 (t, J=3.1 Hz, 4H); $^{13}$C-NMR (DMSO-d6+D$_2$O): 45.7, 37.8; $^{31}$P (DMSO-d6+D$_2$O, without internal standard): −39.2.

Example 3 Preparation of the Compound of Formula

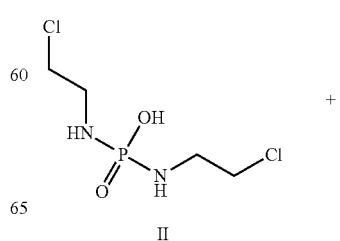

-continued

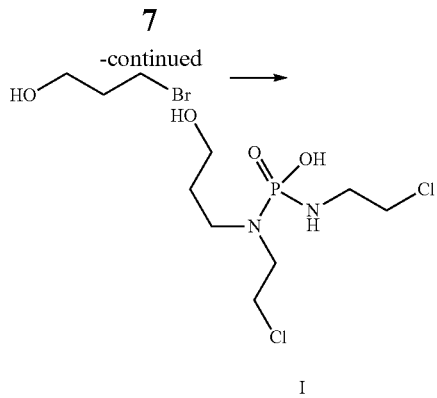

In a 1000 ml reaction flask, the compound of formula II (59 g, 0.267 mol) was dissolved in dichloromethane (500 ml). Triethylamine (50 ml, 0.358 mol, 1.35 eq.) was added, and 3-bromo-propane-1-alcohol (37.11 g, 0.267 mol, 1.0 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 58.86 g, a yield of 79%.

The structure of the obtained compound of formula I was confirmed by NMR. $^1$H-NMR (DMSO+D$_2$O): 3.73 (t, J=6.2 Hz, 2H), 3.62-3.59 (m, 4H), 2.92 (t, J=6.2 Hz, 2H), 2.80 (t, J=6.1 Hz, 2H), 2.51 (t, J=2.2 Hz, 2H), 1.60-1.52 (m, 2H). $^{13}$C-NMR (DMSO+D$_2$O): 58.6, 52.0, 45.8, 42.1, 41.8, 38.1, 31.3. It is consistent with the structural formula of formula I.

Example 4 Preparation of the Compound of Formula I

In a 1000 ml reaction flask, the compound of formula II (59 g, 0.267 mol) was dissolved in dichloromethane (500 ml). Triethylamine (37 ml, 0.267 mol, 1 eq.) was added, and 3-bromo-propane-1-alcohol (33.39 g, 0.240 mol, 0.9 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 48.95 g, a yield of 73%.

The structure of the obtained compound of formula I was confirmed by NMR, which was consistent with the structure of formula I.

Example 5 Preparation of the Compound of Formula I

In a 1000 ml reaction flask, the compound of formula II (59 g, 0.267 mol) was dissolved in dichloromethane (500 ml). Triethylamine (48 ml, 0.347 mol, 1.3 eq.) was added, and 3-bromo-propane-1-alcohol (33.39 g, 0.240 mol, 0.9 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 50.29 g, a yield of 75%.

The structure of the obtained compound of formula I was confirmed by NMR, which was consistent with the structure of formula I.

Example 6 Preparation of the Compound of Formula I

In a 1000 ml reaction flask, the compound of formula II (59 g, 0.267 mol) was dissolved in dichloromethane (500 ml). Triethylamine (55 ml, 0.400 mol, 1.5 eq.) was added, and 3-bromo-propane-1-alcohol (33.39 g, 0.240 mol, 0.9 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 54.31 g, a yield of 81%.

The structure of the obtained compound of formula I was confirmed by NMR, which was consistent with the structure of formula I.

Example 7 Preparation of the Compound of Formula I

In a 1000 ml reaction flask, the compound of formula II (59 g, 0.267 mol) was dissolved in dichloromethane (500 ml). Triethylamine (37 ml, 0.267 mol, 1 eq.) was added, and 3-bromo-propane-1-alcohol (44.52 g, 0.320 mol, 1.2 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 61.84 g, a yield of 83%.

The structure of the obtained compound of formula I was confirmed by NMR, which was consistent with the structure of formula I.

Example 8 Preparation of the Compound of Formula I

In a 1000 ml reaction flask, the compound of formula II (59 g, 0.267 mol) was dissolved in dichloromethane (500 ml). Triethylamine (48 ml, 0.347 mol, 1.3 eq.) was added, and 3-bromo-propane-1-alcohol (44.52 g, 0.320 mol, 1.2 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 55.13 g, a yield of 74%.

The structure of the obtained compound of formula I was confirmed by NMR, which was consistent with the structure of formula I.

Example 9 Preparation of the Compound of Formula I

In a 1000 ml reaction flask, the compound of formula II (59 g, 0.267 mol) was dissolved in dichloromethane (500 ml). Triethylamine (55 ml, 0.400 mol, 1.5 eq.) was added, and 3-bromo-propane-1-alcohol (44.52 g, 0.320 mol, 1.2 eq.) was added dropwise. The dropping rate was controlled so that the temperature was not higher than 30° C. After the dropwise addition was completed, the mixture was reacted at room temperature for 3 hours. Purified water (200 ml) was added and stirred for 30 minutes. The mixture was set aside to separate the water phase. The organic phase was added with n-heptane (500 ml), the temperature was reduced to 0° C. for crystallization, and after drying, the compound of formula I was obtained, 52.90 g, a yield of 71%.

The structure of the obtained compound of formula I was confirmed by NMR, which was consistent with the structure of formula I.

Example 10 Preparation of the Compound of Formula III

The compound of formula of formula I (100 g, 0.36 mol) was added to dichloromethane (500 ml) in a 1 L reaction flask, stirred to dissolve, and cooled to below 20° C. Thionyl chloride (21.31 g, 0.18 mol, 0.5 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (36.26 g, 0.36 mol, 1 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 73.15 g, a yield of 78.2%.

The structure of the obtained ifosfamide was confirmed by NMR. $^1$H-NMR (D$_2$O): 4.47-4.32 (m, 2H), 3.71-3.68 (m, 2H), 3.37-3.31 (m, 4H), 3.66 (t, J=5.8 Hz, 2H), 3.26 (t, J=5.8 Hz, 2H), 2.00-1.93 (m, 2H). $^{13}$C-NMR (D$_2$O): 71.0 (d, J=7.0 Hz), 51.9 (d, J=3.8 Hz), 49.2 (d, J=1.1 Hz), 47.0 (d, J=3.2 Hz), 44.8 (d, J=3.9 Hz), 43.9, 28.7 (d, J=5.1 Hz). The structural of ifosfamide was confirmed.

Example 11 Preparation of the Compound of Formula III

The compound of formula of formula I (100 g, 0.36 mol) was added to dichloromethane (500 ml) in a 1 L reaction flask, stirred to dissolve, and cooled to below 20° C. Oxalyl chloride (22.74 g, 0.18 mol, 0.5 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (36.26 g, 0.36 mol, 1 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 74.18 g, a yield of 79.3%.

The structure of the obtained ifosfamide was confirmed by NMR, which was consistent with the structure of ifosfamide.

Example 12 Preparation of the Compound of Formula III

The compound of formula of formula I (100 g, 0.36 mol) was added to dichloromethane (500 ml) in a 1 L reaction flask, stirred to dissolve, and cooled to below 20° C. Thionyl chloride (25.57 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (36.26 g, 0.36 mol, 1 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 77.08 g, a yield of 82.4%.

The structure of the obtained ifosfamide was confirmed by NMR, which was consistent with the structure of ifosfamide.

Example 13 Preparation of the Compound of Formula III

The compound of formula of formula I (100 g, 0.36 mol) was added to dichloromethane (500 ml) in a 1 L reaction flask, stirred to dissolve, and cooled to below 20° C. Oxalyl chloride (27.29 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (54.38 g, 0.54 mol, 1.5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 72.41 g, a yield of 77.4%.

The structure of the obtained ifosfamide was confirmed by NMR, which was consistent with the structure of ifosfamide.

Example 14 Preparation of the Compound of Formula III

The compound of formula of formula I (100 g, 0.36 mol) was added to dichloromethane (500 ml) in a 1 L reaction flask, stirred to dissolve, and cooled to below 20° C. Thionyl chloride (25.57 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and diisopropylethylamine (69.46 g, 0.54 mol, 1.5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 73.43 g, a yield of 78.5%.

The structure of the obtained ifosfamide was confirmed by NMR, which was consistent with the structure of ifosfamide.

Example 15 Preparation of the Compound of Formula III

The compound of formula of formula I (100 g, 0.36 mol) was added to dichloromethane (500 ml) in a 1 L reaction flask, stirred to dissolve, and cooled to below 20° C. Oxalyl chloride (27.29 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and diisopropylethylamine (69.46 g, 0.54 mol, 1.5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 74.09 g, a yield of 79.25%.

The structure of the obtained ifosfamide was confirmed by NMR, which was consistent with the structure of ifosfamide.

Example 16 Preparation of the Compound of Formula III

The compound of formula of formula I (100 g, 0.36 mol) was added to dichloromethane (500 ml) in a 1 L reaction flask, stirred to dissolve, and cooled to below 20° C. Thionyl chloride (25.57 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and DBU (81.82 g, 0.54 mol, 1.5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 62.86 g, a yield of 67.2%.

The structure of the obtained ifosfamide was confirmed by NMR, which was consistent with the structure of ifosfamide.

Example 17 Preparation of the Compound of Formula III

The compound of formula of formula I (100 g, 0.36 mol) was added to dichloromethane (500 ml) in a 1 L reaction flask, stirred to dissolve, and cooled to below 20° C. Oxalyl chloride (27.29 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and pyridine (42.51 g, 0.54 mol, 1.5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 62.21 g, a yield of 66.5%.

The structure of the obtained ifosfamide was confirmed by NMR, which was consistent with the structure of ifosfamide.

Example 18 Preparation of the Compound of Formula III

The compound of formula of formula I (100 g, 0.36 mol) was added to dichloromethane (500 ml) in a 1 L reaction flask, stirred to dissolve, and cooled to below 20° C. Thionyl chloride (25.57 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (72.51 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 74.09 g, a yield of 79.2%.

The structure of the obtained ifosfamide was confirmed by NMR, which was consistent with the structure of ifosfamide.

Example 19 Preparation of the Compound of Formula III

The compound of formula of formula I (100 g, 0.36 mol) was added to dichloromethane (500 ml) in a 1 L reaction flask, stirred to dissolve, and cooled to below 20° C. Oxalyl chloride (27.29 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (72.51 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 77.18 g, a yield of 82.5%.

The structure of the obtained ifosfamide was confirmed by NMR, which was consistent with the structure of ifosfamide.

Example 20 Preparation of the Compound of Formula III

The compound of formula of formula I (100 g, 0.36 mol) was added to dichloromethane (500 ml) in a 1 L reaction flask, stirred to dissolve, and cooled to below 20° C. Thionyl chloride (25.57 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and 4-dimethylaminopyridine (87.55 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 58.28 g, a yield of 62.3%.

The structure of the obtained ifosfamide was confirmed by NMR, which was consistent with the structure of ifosfamide.

Example 21

The compound of formula of formula I (100 g, 0.36 mol) was added to dichloromethane (500 ml) in a 1 L reaction flask, stirred to dissolve, and cooled to below 20° C. Oxalyl chloride (27.29 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and diisopropylethylamine (92.61 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 59.31 g, a yield of 63.4%.

The structure of the obtained ifosfamide was confirmed by NMR, which was consistent with the structure of ifosfamide.

Example 22

The compound of formula of formula I (100 g, 0.36 mol) was added to dichloromethane (500 ml) in a 1 L reaction flask, stirred to dissolve, and cooled to below 20° C. Thionyl chloride (25.57 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and diisopropylethylamine (92.61 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 73.15 g, a yield of 78.2%.

The structure of the obtained ifosfamide was confirmed by NMR, which was consistent with the structure of ifosfamide.

Example 23

The compound of formula of formula I (100 g, 0.36 mol) was added to dichloromethane (500 ml) in a 1 L reaction flask, stirred to dissolve, and cooled to below 20° C. Oxalyl chloride (27.29 g, 0.21 mol, 0.6 eq.) was added dropwise. The dropping rate was controlled so that the temperature was not higher than 30° C. After addition was completed, the mixture was stirred until the reaction was complete. The temperature of the reaction system was lowered to below 10° C., and DBU (109.09 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 75.12 g, a yield of 80.3%.

The structure of the obtained ifosfamide was confirmed by NMR, which was consistent with the structure of ifosfamide.

Example 24

The compound of formula of formula I (100 g, 0.36 mol) was added to dichloromethane (500 ml) in a 1 L reaction flask, stirred to dissolve, and cooled to below 20° C. Thionyl chloride (29.84 g, 0.25 mol, 0.7 eq.) was added dropwise. The dropping rate was controlled so that the temperature was not higher than 30° C. After addition was completed, the mixture was stirred until the reaction was complete. The temperature of the reaction system was lowered to below 10° C., and DBU (109.09 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 78.77 g, a yield of 84.2%.

The structure of the obtained ifosfamide was confirmed by NMR, which was consistent with the structure of ifosfamide.

Example 25

The compound of formula of formula I (100 g, 0.36 mol) was added to dichloromethane (500 ml) in a 1 L reaction flask, stirred to dissolve, and cooled to below 20° C. Oxalyl chloride (36.38 g, 0.29 mol, 0.8 eq.) was added dropwise. The dropping rate was controlled so that the temperature was not higher than 30° C. After addition was completed, the mixture was stirred until the reaction was complete. The temperature of the reaction system was lowered to below 10° C., and pyridine (56.68 g, 0.72 mol, 2 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 77.08 g, a yield of 82.4%.

The structure of the obtained ifosfamide was confirmed by NMR, which was consistent with the structure of ifosfamide.

Example 26

The compound of formula of formula I (100 g, 0.36 mol) was added to dichloromethane (500 ml) in a 1 L reaction flask, stirred to dissolve, and cooled to below 20° C. Thionyl chloride (42.62 g, 0.36 mol, 1 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (90.64 g, 0.90 mol, 2.5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 79.70 g, a yield of 85.2%.

The structure of the obtained ifosfamide was confirmed by NMR, which was consistent with the structure of ifosfamide.

Example 27

The compound of formula of formula I (100 g, 0.36 mol) was added to dichloromethane (500 ml) in a 1 L reaction flask, stirred to dissolve, and cooled to below 20° C. Oxalyl chloride (54.57 g, 0.43 mol, 1.2 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (108.77 g, 1.07 mol, 3 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 72.22 g, a yield of 77.2%.

The structure of the obtained ifosfamide was confirmed by NMR, which was consistent with the structure of ifosfamide.

Example 28

The compound of formula of formula I (100 g, 0.36 mol) was added to dichloromethane (500 ml) in a 1 L reaction flask, stirred to dissolve, and cooled to below 20° C. Thionyl chloride (63.93 g, 0.54 mol, 1.5 eq.) was added dropwise. The dropping rate was controlled so that the temperature was not higher than 30° C. After addition was completed, the mixture was stirred until the reaction was complete. The temperature of the reaction system was lowered to below 10° C., and triethylamine (181.28 g, 1.79 mol, 5 eq.) was added dropwise. The dropping rate was controlled so that the temperature was not higher than 30° C. After the dropwise addition, the mixture was stirred at 25±5° C. for 10 hours. Water (300 ml) was added to the reaction system, and the mixture was stirred for 1 hour. The water phase was separated. The organic phase was washed with 200 ml×2 water. n-Heptane (600 ml) was added dropwise to the organic phase. The mixture was crystallized below 5° C., filtered, and vacuum dried at 50±5° C. to obtain ifosfamide, 57.06 g, a yield of 61.0%.

The structure of the obtained ifosfamide was confirmed by NMR, which was consistent with the structure of ifosfamide.

The present invention provides a method for preparing ifosfamide. There are many ways to implement this technical solution. The above are only the preferred embodiments of the present invention. It should be pointed out that for those of ordinary skill in the art, without departing from the principle of the present invention, improvements and modifications can be made, and these improvements and modifications should also be regarded as the protection scope of the present invention. All the components that are not clear in the embodiments can be implemented using existing technology.

The invention claimed is:
1. An ifosfamide intermediate, having formula I:

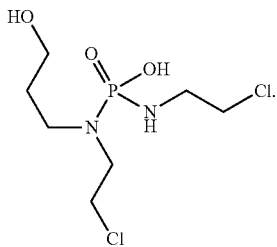

2. A method for preparing ifosfamide, comprising:
reacting a compound of formula II and 3-bromo-propane-1-ol in the presence of triethylamine to obtain a compound of formula I,

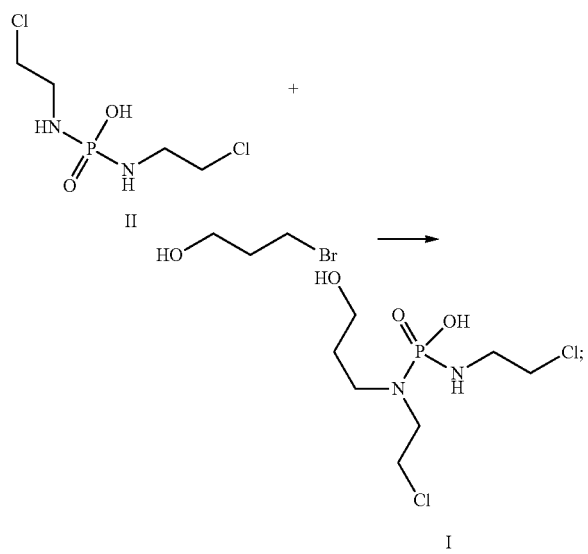

and reacting the compound of formula I with a chlorinating agent in the presence of a base to obtain ifosfamide compound of formula III:

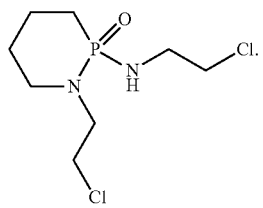

3. The method according to claim 2, wherein a molar ratio of the compound of formula II:3-bromo-propane-1-ol:triethylamine is 1:0.9-1.2:1-1.5.

4. The method of claim 2, wherein the chlorinating agent is thionyl chloride or oxalyl chloride.

5. The method of claim 2, wherein a molar ratio of the chlorinating agent:the compound of formula I is 0.5-1.5:1.

6. The method of claim 5, wherein the molar ratio of the chlorinating agent:the compound of formula I is 0.9-1.2:1-1.5.

7. The method of claim 2, wherein the base is an organic base.

8. The method according to claim 7, wherein the organic base is triethylamine, diisopropylethylamine, 1,8-diazabicycloundec-7-ene, pyridine, 4-dimethylaminopyridine, or a combination thereof.

9. The method of claim 7, wherein a molar ratio of the organic base:the compound of formula I is (1-5):1.

* * * * *